United States Patent [19]
Edmonds, Jr.

[11] Patent Number: 5,884,478
[45] Date of Patent: Mar. 23, 1999

[54] SYSTEM FOR CROSS TURBOCHARGING

[76] Inventor: Dean S. Edmonds, Jr., 1019 Spyglass La., Naples, Fla. 34102

[21] Appl. No.: 62,903

[22] Filed: Apr. 21, 1998

[51] Int. Cl.[6] .................................................. F02B 37/00
[52] U.S. Cl. ............................................................. 60/612
[58] Field of Search ....................................... 60/608, 612

[56]  References Cited

U.S. PATENT DOCUMENTS

| | | |
|---|---|---|
| 2,248,423 | 7/1941 | Buchi . |
| 2,780,053 | 2/1957 | Cowland . |
| 3,027,706 | 4/1962 | Sprick . |
| 3,469,393 | 9/1969 | Tryhorn .................................. 60/612 |
| 3,498,053 | 3/1970 | Johnston . |
| 3,676,999 | 7/1972 | Oldfield ................................... 60/608 |
| 3,734,074 | 5/1973 | Butler et al. . |
| 4,480,968 | 11/1984 | Duerr . |

FOREIGN PATENT DOCUMENTS

| | | | |
|---|---|---|---|
| 64-29621 | 1/1989 | Japan ........................................ 60/612 |
| 5-5420 | 1/1993 | Japan ........................................ 60/612 |

*Primary Examiner*—Michael Koczo
*Attorney, Agent, or Firm*—Pennie & Edmonds LLP

[57]  ABSTRACT

A system for cross turbocharging an engine is disclosed. The system includes a left bank turbine located in close proximity to a left bank of cylinders. The left bank turbine receives exhaust gas from the exhaust ports of each left bank cylinder. This exhaust gas is used to drive the left bank turbine which powers a right bank compressor. The right bank compressor is located in close proximity to a right bank of cylinders and introduces compressed air into the intake ports of each right bank cylinder to turbocharge the right bank of cylinders. In this configuration, the turbine and compressor are separated from each other with the turbine driving the compressor via a connecting shaft that passes across the engine. An analogous configuration involving a right bank turbine and left bank compressor is used to turbocharge the left bank of cylinders. An electric motor can be placed between each turbine and its associated compressor to provide an initial source of supercharging when the engine is first started.

5 Claims, 1 Drawing Sheet

SYSTEM FOR CROSS TURBOCHARGING

FIELD OF THE INVENTION

The present invention relates generally to internal combustion engines, and more particularly to a system for cross turbocharging an internal combustion engine.

BACKGROUND OF THE INVENTION

It is well known to provide an internal combustion engine with a turbocharger to enhance engine performance. The basic components of a turbocharger are a gas turbine driven by engine exhaust and a compressor powered by the turbine for compressing and directing atmospheric air under pressure to engine air intake. U.S. Pat. Nos. 2,780,053, 3,498,053, and 3,734,074 teach various turbochargers. Prior art also discloses the use of a cross turbocharger, i.e. a system in which a left turbocharger connected to a left bank of cylinders charges a right bank of cylinders and a right turbocharger connected to a right bank of cylinders charges a left bank of cylinders. For example, U.S. Pat. No. 3,027,706 teaches a cross-over system.

In any turbocharger, crossed or not, the piping used to connect the various parts of the turbocharger and to connect the turbocharger with the rest of the engine is complex. This complex design causes adverse consequences such as increased engine size, more severe and frequent maintenance problems, and decreased efficiency. The decreased efficiency results from phenomena such as gas friction.

Because the turbocharger relies on the engine exhaust to power the turbine, the turbocharger provides little or no charge when the engine is first started. In fact, the stopped compressor impedes intake of air and actually makes starting more difficult. Start-up difficulties with turbochargers are particularly a problem with diesel engines.

As this discussion illustrates, there is a need for an improved system for cross turbocharging.

SUMMARY OF THE INVENTION

The system for cross turbocharging an engine according to the present includes a left bank turbine located in close proximity to (e.g. directly beneath) a left bank of cylinders for receiving exhaust gas from the exhaust ports of each left bank cylinder. This exhaust gas is used to drive the left bank turbine which powers a right bank compressor located in close proximity to (e.g. directly beneath) a right bank of cylinders. The right bank compressor introduces compressed air into the intake ports of each right bank cylinder to supercharge the right bank of cylinders. An analogous configuration involving a right bank turbine and left bank compressor supercharges the left bank of cylinders. In each case the turbine and compressor are separated from each other and are connected by a drive shaft passing across the engine. An electric motor can be installed on this shaft to provide an initial source of supercharging when the engine is first started.

DESCRIPTION OF THE PREFERRED EMBODIMENTS

Figure 1:
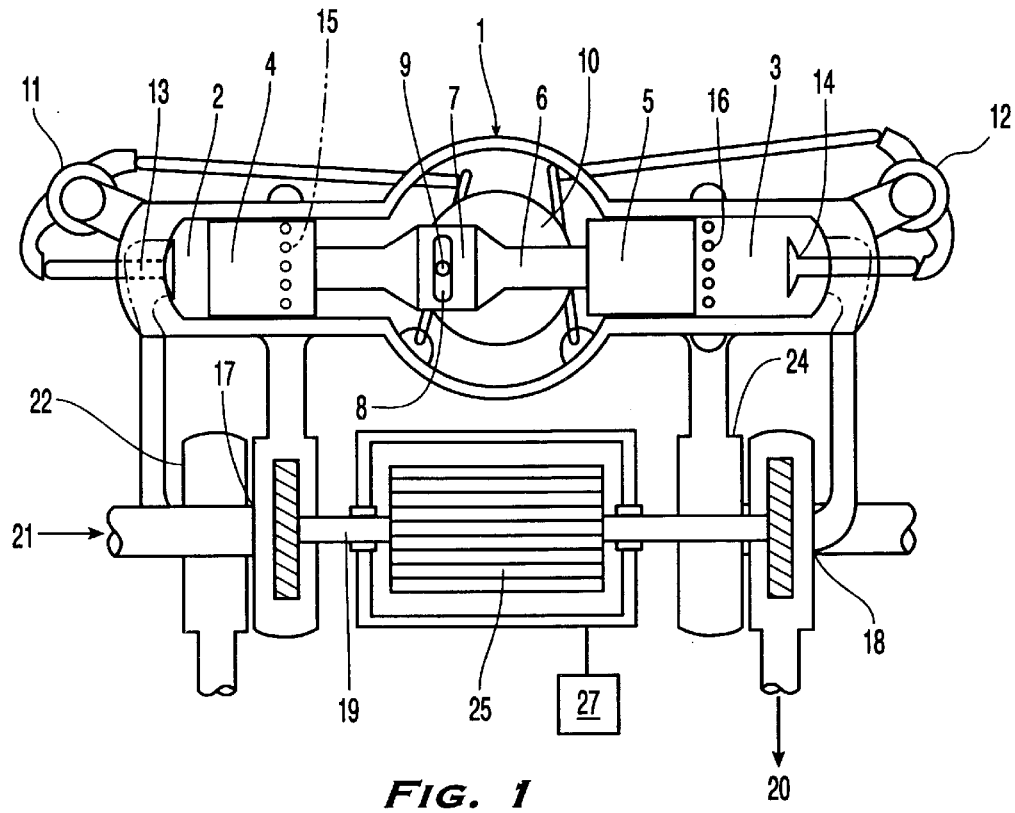
FIG. 1 shows a front schematic of an internal combustion engine utilizing the system for cross turbocharging according to the present invention.

FIG. 1 shows a two cylinder opposed internal combustion engine 1 having a left cylinder 2 opposed by a right cylinder 3. Left cylinder 2 contains a left piston 4 and right cylinder 3 contains a right piston 5. Left piston 4 and right piston 5 are connected by a solid piston rod 6 which includes scotch yoke 7 containing a slot 8 in which crankpin 9 rides. It should be noted that the scotch yoke setup is not part of the invention and any means for driving the crankshaft can be used. Crankpin 9 is a part of a crank disc 10, which is on the crankshaft (not shown) and has its periphery formed to operate left and right exhaust valve trains 11, 12 and left and right overhead exhaust valves 13, 14.

Intake for the left cylinder 2 is provided by left cylinder intake ports 15 and intake for the right cylinder is provided by right cylinder intake ports 16. The intake ports are arranged so that when the piston is at the bottom of the stroke, the intake ports are uncovered. A left supercharging compressor 17 is mounted in close proximity to, e.g., directly below, intake ports 15 of left cylinder 2. Rather than having the driving turbine located right beside left supercharging compressor 17 or as part of the same unit as would be the case in a conventional turbocharger, according to the present invention, a right driving turbine 18 is mounted under right overhead exhaust valve 14. In operation, right driving turbine 18 receives exhaust gas from right cylinder 3 and uses the exhaust gas to drive left supercharging compressor 17 through a left connecting shaft 19. Exhaust gas is removed from right driving turbine by an outlet 20. Powered by right driving turbine 18, left supercharging compressor 17 takes air from an inlet 21, compresses the air, and introduces the compressed air to left cylinder intake ports 15. As would be the case with a conventional turbocharger, it is the introduction of the compressed air that enhances engine performance.

Figure 2:
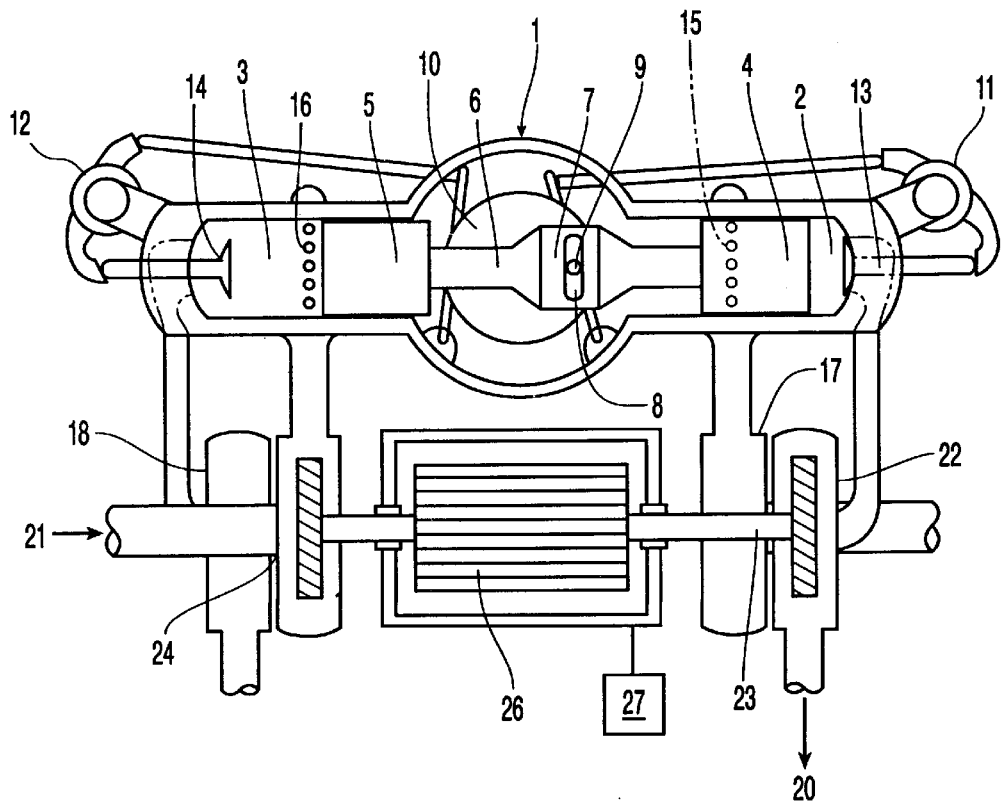
FIG. 2 shows a back schematic of the internal combustion engine utilizing the system for cross turbocharging.

The above description has explained how right driving turbine 18 uses the exhaust from right cylinder 3 to power left supercharging compressor 17 to turbocharge left cylinder 2. As shown in FIG. 2, in an analogous fashion a left driving turbine 22 uses the exhaust from left cylinder 2 to power, via a right connecting shaft 23, a right supercharging compressor 24 to turbocharge right cylinder 3.

Locating the turbines in close proximity to the exhaust ports and the compressor in close proximity to the intake ports eliminates the complex piping of conventional turbocharging arrangements and minimizes associated drawbacks. FIG. 1 also shows another benefit resulting from the placements of left supercharging compressor 17 and right driving turbine 18. Specifically, along the length of left connecting shaft 19, a left electric motor 25 is placed between left supercharging compressor 17 and right driving turbine 18. Left electric motor 25 serves to spin up left supercharging compressor 17 and thus provide an initial supercharge when engine 1 is being started. A right electric motor 26 spins up right supercharging compressor 24. If engine 1 is a diesel engine, left and right electric motors 25, 26 can be connected to engine starting system 27 in such a fashion that left and right electric motors 25, 26 are run at the same time as the engine glow plugs (not shown).

The present invention can be utilized in any internal combustion engine, not just a two cylinder opposed internal combustion engine as shown as engine 1 in FIGS. 1 and 2. In the event that an engine having more than two cylinders is used, then there would be a left exhaust manifold embracing the exhaust ports of all the cylinders of the left engine bank connected to one left driving turbine. The left driving turbine would be connected to a right supercharging compressor which in turn would be connected to a right intake manifold involving the intake ports of all the cylinders on the right bank. A similar configuration would exist for the other side of the engine.

While it is apparent that the illustrative embodiments of the invention herein disclosed fulfil the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A system for cross turbocharging an opposed cylinder internal combustion engine having a left bank of cylinders located on a first side of the engine and a right bank of cylinders located on a second side of the engine, the left and right banks including a piston, at least one intake port, and at least one exhaust port for each cylinder in the left and right banks, said system comprising:

a right bank turbine located on the second side of the engine and having an inlet connected to the right bank of cylinders for receiving exhaust gas from the at least one exhaust port of each right bank cylinder and having a mechanical output connected to a left connecting shaft;

a left bank compressor located on the first side of the engine and having a mechanical input connected to the left connecting shaft for receiving power from the right bank turbine and having an outlet connected to the left bank of cylinders for introducing compressed air into the at least one intake port of each left bank cylinder;

a left bank turbine located on the first side of the engine and having an inlet connected to the left bank of cylinders for receiving exhaust gas from the at least one exhaust port of each left bank cylinder and having a mechanical output connected to a right connecting shaft; and a right bank compressor located on the second side of the engine and having a mechanical input connected to the right connecting shaft for receiving power from the left bank turbine and having an outlet connected to the right bank of cylinders for introducing compressed air into the at least one intake port of each right bank cylinder.

2. The system of claim 1, wherein:

a first electric motor for providing an initial source of power to the left bank compressor is inserted in the left connecting shaft between the mechanical output of the right bank turbine and the mechanical input of the left bank compressor; and a second electric motor for providing an initial source of power to the right bank compressor is inserted in the right connecting shaft between the mechanical output of the left bank turbine and the mechanical input of the right bank compressor.

3. The system of claim 2, wherein the first and second electric motors are connected to an engine starting system.

4. The system of claim 1, wherein:

a left exhaust manifold is connected to the at least one exhaust port of each left bank cylinder and has an outlet connected to the inlet of the left bank turbine;

a right intake manifold is connected to the at least one intake port of each right bank cylinder and has an inlet connected to the outlet of the right bank compressor;

a right exhaust manifold is connected to the at least one exhaust port of each right bank cylinder and has an outlet connected to the inlet of the right bank turbine; and a left intake manifold is connected to the at least one intake port of each left bank cylinder and has its inlet connected to the outlet of the left bank compressor.

5. The system of claim 1, wherein:

the right bank turbine is located in close proximity to the right bank of cylinders;

the left bank compressor is located in close proximity to the left bank of cylinders;

the left bank turbine is located in close proximity to the left bank of cylinders; and the right bank compressor is located in close proximity to the right bank of cylinders.

* * * * *